March 3, 1931.  F. C. F. PORTAIL  1,795,037

CARBURETING PROCESS AND APPARATUS

Filed June 15, 1927

INVENTOR
FERNAND CHARLES FREDERIC PORTAIL
By
William H. Young.
Attorney

Patented Mar. 3, 1931

1,795,037

UNITED STATES PATENT OFFICE

FERNAND CHARLES FREDERIC PORTAIL, OF GENNEVILLIERS, FRANCE, ASSIGNOR TO SOCIÉTÉ ANONYME LE CARBONE, OF PARIS, FRANCE

CARBURETING PROCESS AND APPARATUS

Application filed June 15, 1927, Serial No. 199,003, and in France April 13, 1927.

In the volatile fuel carburetors now in use although the atomization may be improved due to the use of mechanical atomizers, and although in certain carburetors the volatile fuel has even been heated in order to assist in vapourizing it, a perfectly homogeneous mixture is not obtained. Instead there is formed a mixture of vapours, mist and air, which will not burn completely, so that a certain proportion of the fuel is lost.

Now the object of the present invention is to prevent this loss, and to obtain a complete utilization of the volatile fuel used, while at the same time improving the efficiency of the motor.

The invention consists in principle, in producing a chemical decomposition of the fuel used in the presence of a special catalyzer, after having heated it in a suitable manner. The fuel is transformed into lighter and more inflammable products, which mix better with the air and give a complete combustion, thereby increasing the efficiency of the motor, its consumption being reduced at the same time.

The catalyzer used in conformity with the present invention is extremely porous and very active carbon which may be in the form of blocks or in a crushed state. Preferably it is in a compact form and may be provided with small narrow ducts.

The fuel mixed with the quantity of air necessary for causing atomization is passed through the active carbon forming the catalyzer which is preferably at a temperature between 300 and 400° C. After passing through the catalyzer it is mixed with the air intended to ensure the combustion and is conducted to the motor.

To enable the invention to be better understood there have been shown, in the accompanying diagrammatic drawings, given by way of example only, two constructional forms of the carbureting apparatus, by which the process of the invention may be carried into effect.

In these drawings:—

Figure 1:
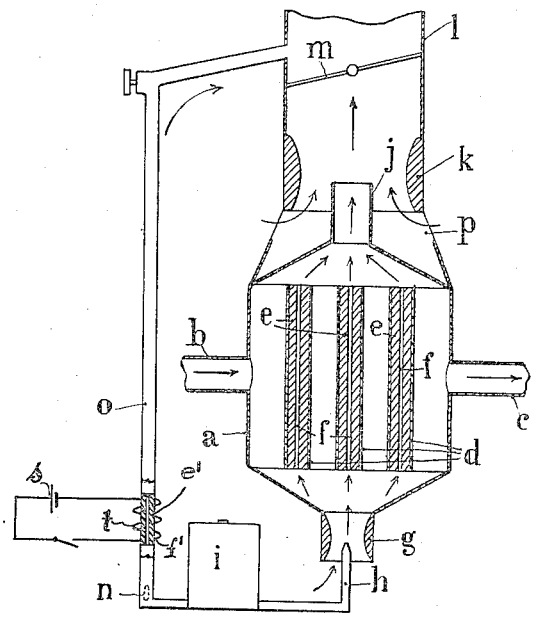
Figure 1 is a vertical section of an embodiment of the invention.

As will be seen from the drawings the new apparatus comprises a body $a$, composed of a casing of bronze, aluminum or other metal not subject to the attacks of the exhaust gases, which are admitted into said casing by a piping $b$, and passed off through another piping $c$. In this casing there are located the tubes $d$, for example of red copper in order to avoid breakages due to the effects of expansion.

These tubes are entirely or partially filled with active carbon in the form of cylinders $e$, which may be solid or provided with channels. In the examples shown it has been assumed that these cylinders are provided with a narrow axial conduit $f$.

The base of the body $a$ is connected to a diffuser $g$ of suitable shape, into which there opens a fuel nozzle $h$. This latter is of the type adopted for use with ordinary carburetors and is fed from a float chamber or other constant level chamber $i$, and so constructed and located that it contains a reserve of fuel which may be rapidly utilized at the moment when acceleration is effected.

The upper part of the body $a$ is connected to a conduit $j$ through which the decomposed fuel mixed with the atomizing air flows. This conduit is provided in a diffuser $k$, having the form of a Venturi tube, an induction piping $l$ communicating with the motor and provided with a butterfly valve $m$ for regulation purposes. The apparatus is completed by a slow speed nozzle $n$ arranged in any suitable manner, and connected by a tube $o$ to the piping $l$ above the butterfly valve.

When starting up, the slow speed nozzle $n$ operates in the same way as in an ordinary carburetor. It may also be provided with a carbon catalyzer $e'$ having a narrow axial conduit $f'$ and be heated by any suitable means, as for example by the action of a battery $s$ or other source of electricity upon an electric resistance $t$.

When running normally the fuel atomized by the nozzle $h$, and mixed with the air entering through the diffuser $g$, traverses the carbon catalyzers $e$, raised to a suitable temperature by the exhaust gases. The temperature obtained may be regulated, for example, by causing a greater or lesser part of these gases to pass into the body $a$.

The fuel in contact with the active carbon is decomposed into lighter and more inflammable products. The parts not converted are vapourized by the heat. The result is that these products become mixed with the air entering the diffuser $h$ through the ports $p$, and the final result is that the mixture obtained is completely burnt up in the motor while developing a higher power than with the ordinary carburetors.

The air entering at $p$ may be slightly heated for example, by coming in contact with the casing $a$, so that in this way any condensation of the combustible vapours is prevented.

If the nozzle $h$ is of the normal type the carbon cylinders $e$ need not be channeled; the fuel is compelled to traverse the carbon from bottom to top. However, in order to facilitate recoveries it is preferable in this case to provide the cylinders with such conduits or channels as have been shown at $f$.

The invention may be realized otherwise than according to the apparatus which has just been described.

For example, the combustible may be vapourized before it is caused to contact with the active carbon.

Figure 2:
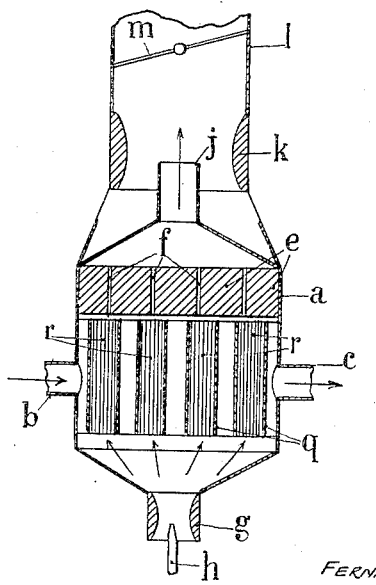
Figure 2 is a vertical section of a modification.

Figure 2 represents an example of this arrangement. The apparatus is similar to that shown in Figure 1, except that it comprises separate means for vaporizing and decomposing the fuel. It comprises a group of tubes $q$, containing copper wires or wires of other metal, or metal shavings, etc., intended to vapourize the fuel.

Above these tubes there is provided a plate of active carbon $e$ provided or not with holes $f$.

By means of this arrangement the fuel reaches the carbon in the form of vapour. Furthermore, it is to a certain extent purified, because the wires or shavings retain all impurities, such as asphalt.

The new arrangements have not only the advantage as heretofore set forth, of ensuring complete combustion, of avoiding losses of combustible and of augmenting efficiency, but also of permitting the use of more or less impure fuels or mixture of fuels which do not behave in a satisfactory manner under ordinary circumstances.

The arrangements hereinbefore described are only given by way of example, as all the details of execution and operation, the forms, materials and dimensions can be varied without in any way changing the principle of the invention.

I claim:

1. In a carburetor for engines, means for producing a chemical decomposition of the volatile engine fuel and comprising a catalyst consisting of very active porous carbon, and means for heating said catalyst and volatile fuel to a temperature between 300 and 400° C.

2. In a carburetor for engines, means for producing a chemical decomposition of the volatile engine fuel and comprising a catalyst consisting of a plurality of masses of very active porous carbon, means for heating said catalyst and volatile fuel to a suitable temperature, and means for causing a mixture of the volatile fuel and air to traverse said catalyst.

3. In a carburetor for engines, means for producing a chemical decomposition of the volatile engine fuel and comprising a catalyst consisting of solid blocks of very active porous carbon, means for heating said catalyst and volatile fuel to a suitable temperature, and means for causing a mixture of the volatile fuel and air to traverse said catalyst.

4. In a carburetor for engines, means for producing a chemical decomposition of the engine fuel and comprising a catalyst consisting of masses of very active porous carbon, means for heating said catalyst and fuel and a nozzle for leading the fuel and air to the catalyst, and a slow-speed nozzle opening into the carburetor beyond the catalyst.

5. In a catalyst for engines, means for producing a chemical decomposition of the engine fuel and comprising a catalyst consisting of masses of very active porous carbon, means for heating said catalyst and fuel and a nozzle for leading the fuel and air to the catalyst, a slow-speed nozzle opening into the carburetor beyond said catalyst, a catalyst for the slow-speed nozzle consisting of very active porous carbon, and means for heating the slow-speed nozzle catalyst.

6. In a carburetor for engines, a casing having an inlet and an outlet, means for passing the exhaust gases from the engine through the casing, tubes in the casing closed to the exhaust gases, a cylinder of very active porous carbon in each tube to act as a catalyst, a fuel nozzle opening into the inlet of the casing, and a tube at the outlet of the casing leading to the engine and provided with openings for the admission of air.

7. In a carburetor for engines, means for heating and vaporizing the volatile fuel, and means for chemically decomposing the volatile fuel comprising a catalyst consisting of very active porous carbon.

The foregoing specification of my "improvements in carbureting processes and apparatus" signed by me this 1st day of June 1927.

FERNAND CHARLES FREDERIC PORTAIL.